(12) United States Patent
Nunally

(10) Patent No.: US 6,496,933 B1
(45) Date of Patent: Dec. 17, 2002

(54) DOCUMENT AUTHENTICATION USING A MARK THAT IS SEPARATE FROM DOCUMENT INFORMATION

(75) Inventor: Patrick O'Neal Nunally, Del Mar, CA (US)

(73) Assignee: Canon Sales, Inc., Chiba-ken (JP)

( * ) Notice: Subject to any disclaimer, the term of this patent is extended or adjusted under 35 U.S.C. 154(b) by 0 days.

(21) Appl. No.: 09/173,086

(22) Filed: Oct. 14, 1998

(51) Int. Cl.[7] .................................................. H04L 9/00
(52) U.S. Cl. ....................................................... 713/176
(58) Field of Search .................................. 713/176, 180; 380/46, 54, 205, 207, 243; 382/173, 181

(56) References Cited

U.S. PATENT DOCUMENTS

| | | | | |
|---|---|---|---|---|
| 5,541,993 A | * | 7/1996 | Fan et al. .................... | 380/243 |
| 5,636,292 A | | 6/1997 | Rhoads ........................ | 382/232 |
| 5,710,834 A | | 1/1998 | Rhoads ........................ | 382/232 |
| 5,745,604 A | | 4/1998 | Rhoads ........................ | 382/232 |
| 5,748,763 A | | 5/1998 | Rhoads ........................ | 382/115 |
| 5,748,783 A | | 5/1998 | Rhoads ........................ | 382/232 |
| 5,768,426 A | | 6/1998 | Rhoads ........................ | 382/232 |
| 5,875,249 A | * | 2/1999 | Mintzer et al. ............... | 380/54 |
| 6,122,392 A | * | 9/2000 | Rhoads ........................ | 382/100 |

OTHER PUBLICATIONS

Bernard Sklar, "Digital Communications—Fundamentals and Applications" PTR Prentic Hall, pp. 546–549, 1988.
"Dictionary of Computing", 4th Ed., Oxford University Press, p. 235, 1996.
"Dictionary of Computing", 8th Ed., IBM, p. 205, 1987.
"Marking Text Documents", Maxemchuk et al, International Conference On Image Processing, Santa Barbara, CA., Oct. 26–29, 1997.
"Copyright Protection For The Electronic Distribution Of Text Documents", Brassil et al, Processing of the IEEE, Jun. 1999.
"Electronic Marking And Identification Techniques To Discourage Document Copying", Brassil et al, IEEE, vol. 13, No. 8, Oct. 1995.
"Techniques For Data Hiding", Bender et al, IBM Systems Journal, vol. 35, Nos. 3&4, 1996.
"Information Hiding—A Survey", Petitcolas, et al, Proceedings of the IEEE, 87(7):1062–1078, Jul. 1999.

* cited by examiner

Primary Examiner—Matthew Smithers
(74) Attorney, Agent, or Firm—MacPherson Kwok Chen & Heid LLP

(57) ABSTRACT

A digital mark is derived or created for placement on a document to identify, authenticate, or verify the document's origins. Private information is received and digitized. The digitized private information is scrambled in response to the document's contents. The scrambled private information is formed into a mark. The mark is placed on or in the document, apart from the document's information.

52 Claims, 6 Drawing Sheets

DOCUMENT AUTHENTICATION USING A MARK THAT IS SEPARATE FROM DOCUMENT INFORMATION

BACKGROUND OF THE INVENTION

Field of the Invention

This invention concerns the use of marks to identify and/or authenticate documents. More particularly, the invention concerns the identification and/or authentication of a document by means of a mark on the document that is separate from information that the document contains.

A document contains information. According to an authoritative definition, a document is " . . . information and the medium on which it is recorded . . .". In this regard, a document can be embodied in an image on a piece of paper, written information on a print-supporting medium, and electronic or optical data on a storage medium. Examples of common documents abound. Checks, photographs, movies on film or video, audiotapes, CD's, and passports are examples of documents.

It is increasingly important to be able to identify, authenticate and/or validate documents. In the past, such functions have been provided, for example, by the "chop" on a sheet of calligraphy, the account number on a check, a photograph on a passport, and a signature or thumbprint on a testament. The purpose of such measures is to prevent the illegal, unauthorized, unscrupulous, or nefarious use of original documents and their authorized copies. Consider, for example, the unauthorized use of a counter check that identifies a checking account depositor correctly. Without a discernable account number, the check will not be authorized for payment. However, the depositor will be assured of clearance of a check that bears both her account number and signature.

In the modern world of digital information, the ease with which documents can be obtained, copied, modified and transferred necessitates the provision of corresponding means for document identification, authentication and/or validation.

In this application, the term "digital mark"(or, simply "mark") is used to signify the existence of a digital object that may be appended, added to or placed on a document for the purposes of identifying, authenticating, or otherwise validating the document. The digital object embodying the digital mark is typically derived from signals representing information beyond that which is apparent in the document. In this regard the term "digital object" signifies a perceptible or discernable object that is, or is created or derived from a digital representation that may be a vector, array, or sequence of ones and zeroes, or of pixels. Once created or derived, the mark may be appended to the information in the document, separately from the information, or may be embedded in the information so as to make it difficult to perceive when the document's information is comprehended in a content-appropriate manner. Thus, for example, an audiotape may have a digital mark woven into the audio information in such a way as to be imperceptible to a listener, but tractable to authenticating means that knows how and where to find the mark.

Digital marks that are perceptible and separate from the information in the document which they identify, authenticate and/or validate have the advantage of being relatively simple and inexpensive to locate and to process. No special means are necessary to perceive and extract the mark from the information contained in a document. Decoding the mark is simply a matter of applying a process that is inverse to that utilized for generating the mark. Any document without the mark will be presumed to be unidentifiable, inauthentic, or otherwise invalid.

SUMMARY OF THE INVENTION

The invention provides derivation of a digital mark that is to be placed in a document apart from the information that the document contains. The invention is based on the critical realization that a robust mark may be derived by a process that combines the information in the document with private, extra-documentary information. The process receives the private information as an input and then scrambles the private information in response to the information in the document. Scrambling is a process of pseudo-randomization of the input private information that may be accomplished, for example, by means of a linear feedback shift register (LFSR) clocked in response to the document information. The scrambled private information provides a digital mark that may be placed in or on the document, apart from the information content of the document. In a particularly useful embodiment, the digital mark is processed to create a "blaze" by image processing that is analogous to "smearing" the pixels of an image.

Accordingly, it is an objective of this invention to cause the generation of a digital mark by scrambling private information in response to the information of a document that is to be marked.

In this regard, the scrambling is particularly efficiently accomplished by seeding an LFSR with the private information and then clocking the operation of the LFSR in response to the document information.

These objectives and other advantages become evident in when following detailed description is read with reference to the below-described drawings.

DETAILED DESCRIPTION OF THE PREFERRED EMBODIMENTS

My invention concerns a method and an apparatus for generating a mark to be placed on a document, apart from the document's contents, that identifies, authenticates, or otherwise validates the document. Relatedly, a document is defined in the *IBM Dictionary of Computing*, Eighth Edition (March 1987), as "information and the medium on which it is recorded that generally have permence and can be read by humans or by a machine . . . ". A document may be a photograph, a graphic printed by a computer system, text, a book, a digitized image in storage, and so on. Generally, no matter what the instrument of perception (human or machine) I consider a document to contain information that may be subjected to a lossy type of compression and still be perceptible when decompressed.

Figure 1:
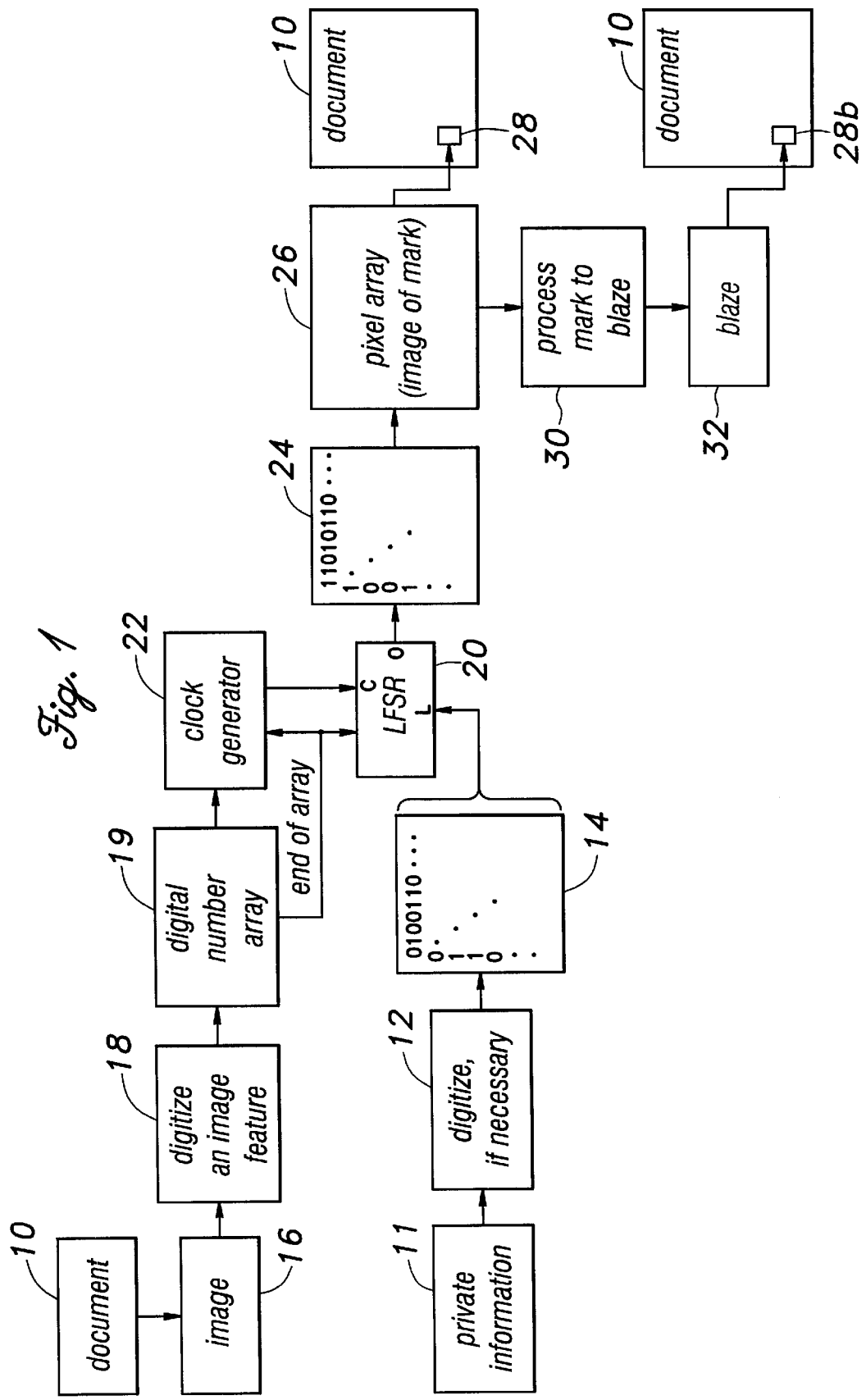
FIG. 1 is a block diagram organized to illustrate the functional components and operational flow of a system and a process that create a digital mark according to the invention.

FIG. 1 is a block diagram organized to illustrate the functional components and operational flow of a system and a process that creates a digital mark according to my invention. The digital mark is derived, created, or otherwise generated in order to be placed in or on a document 10 for the purpose of identifying, authenticating, or otherwise validating the document 10. The mark is derived by processing private information 11 in response to the contents of the document 10. In this regard, the private information may comprise any type of information in any form that can be transformed into a digital representation and that is private to a person, organization, or machine having some relationship to the contents of the document 10. The private information 11 may comprise, for example, a private number set or sequence such as a social security number, a driver's license number, a DNA sequence, or a telephone number. Private information may also comprise a private character set or sequence, a private alphanumeric set or sequence, a private graphic, a private image, a private document, or a private code (a genetic code, for example). It is necessary that the private information 11 be repeatable in the sense that, from one operation of the system and process of FIG. 1 to another, the private information will not change. In this regard, a signature would be inappropriate, given the variability from one instantiation to another. However, an image of the signature might serve satisfactorily as the private information 11. The private information 11 is input to a digitizing process 12 which reduces the private information to a digital electronic form having a predetermined size. For example, assume that the private information 11 consists of a social security number input in standard decimal form. Assume that the output of the digitization element or function is constrained to be a digital sequence of 8K bits. In this case, the digitization element or function 12 would convert the social security number into digital form and replicate the digital form as many times as is necessary to provide a sequence of 8,000 bits. The digital form of the private information is represented by a two-dimensional array 14 of ones and zeroes ("binary digits" or "bits") that would reside, for example, in the memory of a computer. The two-dimensional array 14, may of course be assembled into a 1×8,000 bit vector by conventionally scanning it row by row from top left to right bottom. In this latter regard, the private information would be a digital number of 8,000 bits. At this point, the private information has been rendered (in a manner that is repeatable) into a digital object that may be processed in response to the information contained in the document 10.

Returning now to the document 10, an image 16 of the document is obtained by conventional means. In this regard, the Oxford *Dictionary of Computing*, Fourth Edition (1996) defines an image as "a copy in memory of data that exists elsewhere . . . ". Preferably the image 16 is a digital image that may be digitally processed by well known, repeatable means to produce a digital representation of some feature of the image 16. For example, the digitizing element or step 18 may comprise processing according to the well-known ISO 10918 standard, with the product being an image feature such as spectral content, that may be represented by a rectangular array 19 of samples, with each sample being embodied in a digital number.

Without limiting the scope of my invention, another example may be considered. Assume that the document 10 is a video and that the image 16 is a sequence of digitized video frames. Now, the digitization element or step 18 could comprise an embodiment of the well-known ISO/IEC 11172 standard which compresses video images with associated audio and timing information. The output of the element or step 18 could be one, some, or all of the frames of the video in some predetermined repeatable sequence.

Up to this point, I have described how private information is received and rendered into a digital form that may be processed in response to a digital form of some feature of the information contained in the document 10. Preferably, my invention provides for scrambling of the private information in the digital array 14 in response to the digitized image feature produced at 18. Preferably, scrambling is done in a linear feedback shift register (LFSR) 20 that is seeded by a 1×n digital number embodying the digitized private information available in the array 14. In this regard "seeding" means initially loading the digital number into the LFSR 20 through its loading port (L). The LFSR 20 is a shift register of n-stages whose operation is controlled by sequence of clock pulses provided from the clock generator 22 to the clock port (C) of the LFSR 20. The operation of an LFSR such as the LFSR 20 may be understood with reference to Sklar's *DIGITAL COMMUNICATIONS Fundamentals and Applications,* Princess-Hall (1988), pp. 546–549. The LFSR 20 scrambles the digital number embodying the private information in a series of shifts, each shift occurring in response to a clock pulse produced by the clock generator 22. The clock generator 22, whose operation is discussed in more detail below, operates in response to the array of samples produced by the element or function 18. When the array has been traversed, an END OF ARRAY signal is produced that disables the clock generator 22 and unloads the contents of the LFSR 20 by way of its output port (O). When the END OF ARRAY signal occurs, the operation of the LFSR 20 will have scrambled the digital number that embodies the private information in a pseudorandom manner. This process may also be referred to as "randomization" or "pseudorandomization". The contents of the LFSR 20 are then arranged into an array 24 of ones and zeroes. Preferably, the array is a two-dimensional matrix. As is known in the image processing art, a two-dimensional array of binary digits may be represented in a visual manner as a two-tone image formed by an array of pixels, with each pixel corresponding to a respective identically-located bit in the array of binary digits. In this regard, if rendered as a visually-perceptible image, the array would be black at each pixel location corresponding to a one in the array of binary digits, and would be no color or white at each pixel location corresponding to a zero in the array of binary digits. This two-toned pixel array is represented at 26. Assuming as per the example discussed above that the LFSR contains 8,000 binary digits, the arrays 24 and 26 would be approximately 90 bits×90 bits in size, with a high degree of granularity in the image produced by the pixel array 26. It is possible to reduce the image of the pixel array 26 and append it as a mark 28 on the document 10.

Now, the document 10 with the mark 28 included therein or thereon may be copied many times. It is possible that the process may reduce the resolution of the contents of the document 10, including the resolution of the mark 28. Ultimately, after production of a compounded number of copies, the mark 28 may be indecipherable. One way to increase the compound number of copies that may be made of the document 10 with the mark 28 on it is to reduce the granularity of the mark 28. This is accomplished in element or step 30 which operates on the pixel matrix 26 by distorting the image in a predetermined and repeatable way that results in a distinct mark having a coarser granularity than the pixel array 26. The product of the element or process 30 is referred to as a "blaze". The image of the blaze is applied to the document at 32, the product being the document 10 on or in which the blaze 28b has been placed.

Certain details of the invention will now be discussed in greater detail. These details include the digital processing of the image 16, operation of LFSR 20, processing of the private information 11 and processing of the mark 28 to create the blaze 28b.

Figure 2:
FIG. 2 illustrates a document embodied in an image.
Figure 3:
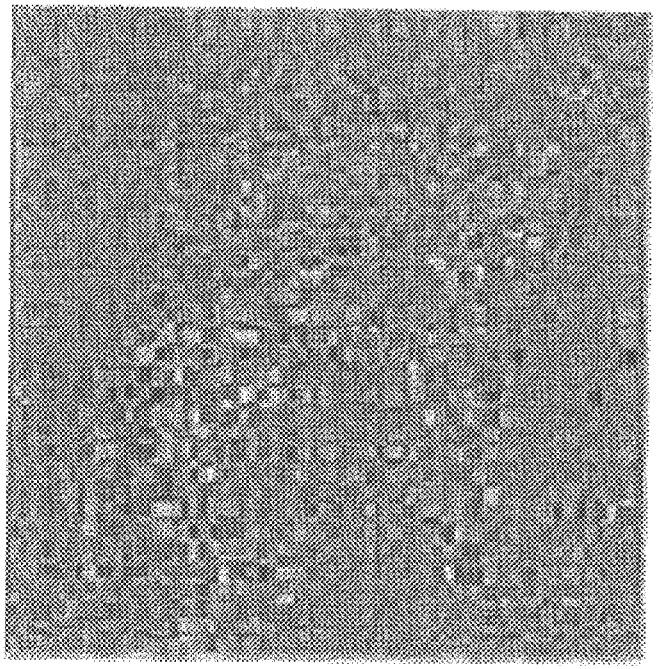
FIG. 3 is a grey scale image of the spectral energy in the tiles of the image of FIG. 2.
Figure 4:
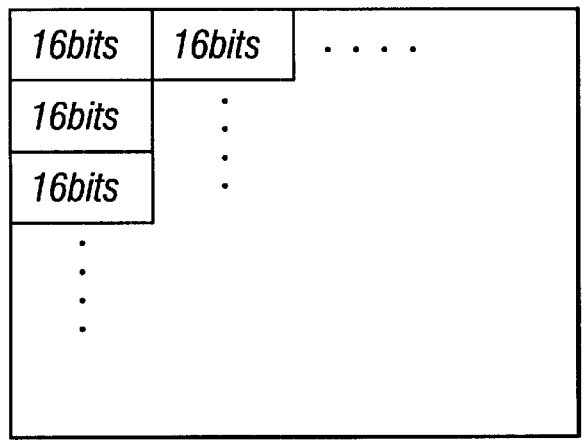
FIG. 4 is a computer memory diagram illustrating an array of digital numbers representing the spectral image of FIG. 3.

Referring to FIG. 2, assume that the document 10 is rendered into the form of the image 16. The image 16 may be represented by the image of FIG. 2. This image may be processed to produce a compressed representation of a feature of the image. For example, the feature may be the image's spectral content. In this case, assuming processing according to the ISO 10918 standard, the image of FIG. 2 is subdivided into 8×8 non-overlapping tiles of pixels. Each tile is processed by application of a discrete cosine transform (DCT) which produces a digital representation of the tile. Each digital representation is quantized and entropy-encoded. Next, each sample is compressed, with the compressed samples arranged into a rectangular array. The rectangular array represents a spectral content of the image. A representative array representing the spectral content of the image of FIG. 2 is shown in FIG. 3. FIG. 3 is a visual encoding of the spectral content; FIG. 4 illustrates the spectral content array of FIG. 3 in the form of a two-dimensional array of 16 bit digital numbers stored in the memory of a computer or processor. Each 16-bit digital number in the array of FIG. 4 corresponds to spectral content of an 8×8 tile of the original image of FIG. 2. The array of FIG. 4 corresponds to the array 19 produced by the element or step 18 of FIG. 1.

Figure 5:
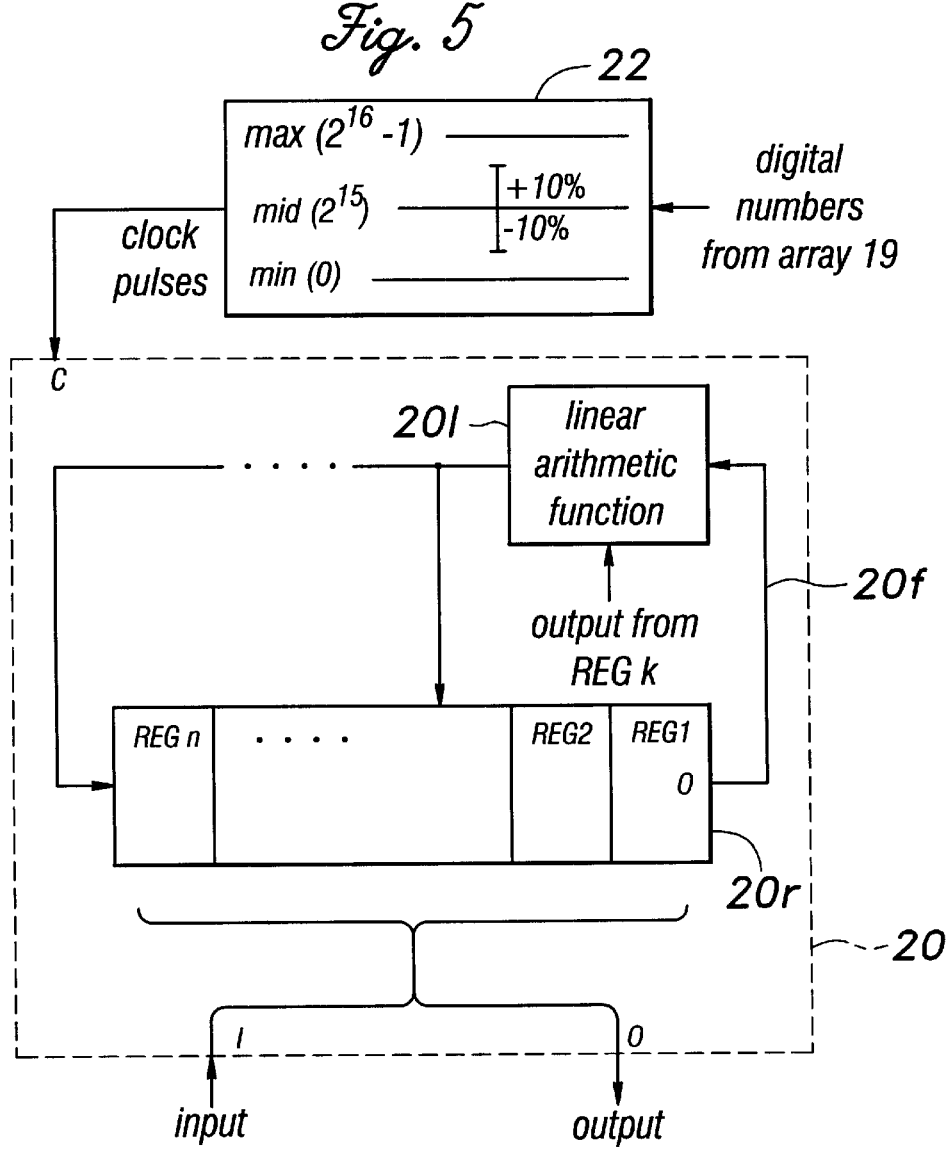
FIG. 5 is a block diagram illustrating the operation of a clocked linear feedback shift register employed by the invention to obtain a digital mark from input private information according to the invention.

Refer now to FIG. 5 for an understanding of how the digitized image feature is used to clock the operation of the LFSR 20. In FIG. 5, the LFSR 20 includes a sequence of n registers 20r that are connected serially. The output of the right-hand register REG1 is fed back on a feedback path 20f in which linear arithmetic element 201 combines the output of the right-hand register REG1 with the output of an earlier register REGk. One or more linear arithmetic elements may be provided in the feedback path 20f. FIG. 5, for illustration only, shows an output of the feedback path 20f being provided to the input of the left-most register REGn. In response to a clock pulse input at the clock port C, the contents of the register array 20r are shifted one register position to the right. Scrambling of the register contents is produced by the one or more linear arithmetic elements in the feedback path 205. The clock generator 22 produces clock pulses in response to the contents of the array of 16-bit digital words represented by FIG. 4. The 16-bit digital numbers are fed sequentially to the input of the clock generator 22. The clock generator 22 embodies a process that determines the magnitude of a 16-bit digital number and then generates a clock pulse only if that magnitude exceeds some predetermined value. In this regard, assuming that the 16-bit number is unsigned, its magnitude may range in value from 0 (min) to a maximum value of $2^{16}-1$ (max). In this case, the 16-bit digital number may have a mid-range value of $2^{15}$. Assuming that the mid-range value is chosen as a threshold, each time a 16-bit number has a magnitude that exceeds the mid-range value, the clock generator 22 generates a clock pulse. On the other hand, no clock pulse is generated if the magnitude of the 16-bit number is less then the mid-range value. In order to ensure stability of operation, the clock generator 22 is invested with hysteresis. In this regard, if the last 16-bit number caused the generation of a clock pulse, then the following 16-bit number will generate a clock pulse so long as its magnitude is greater than 90% of the magnitude of the mid-range value. Similarly, if the last 16-bit number did not result in a clock pulse, then the following 16-bit number will produce a clock pulse only if its magnitude exceeds 110% of the mid-range magnitude.

Figure 6:
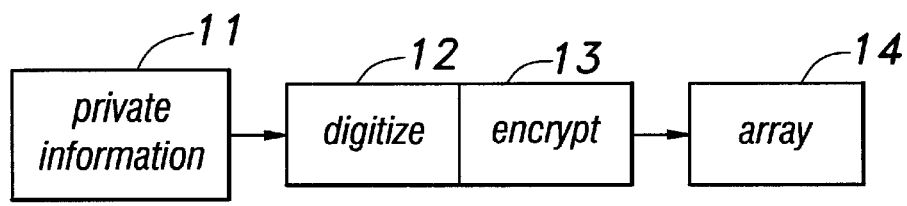
FIG. 6 illustrates the incorporation of encryption into private information processing.

In FIG. 6, an added level of security may be realized by subjecting the digitized private information 12 to an encryption process 13, with the output of the encryption process 13 seeding the LFSR 20.

Figure 7:
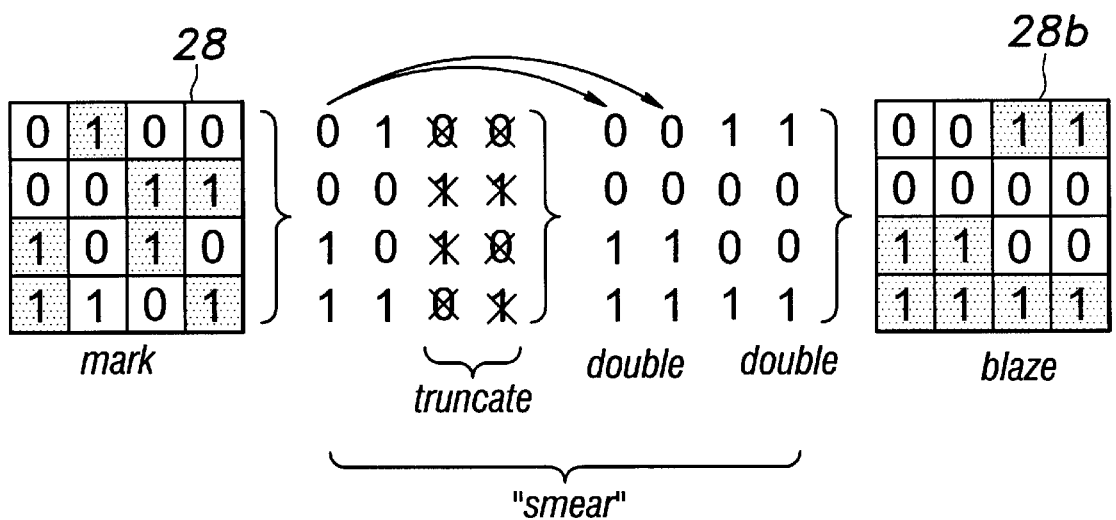
FIG. 7 is a block diagram illustrating how a blaze is derived from a digital mark according to the invention.

The production of a blaze from a mark by "warping" or "smearing" the image of the mark is illustrated in FIG. 7. Assume, for the purpose of illustration, that the mark 28 comprises a 4×4 array of pixels. One way to decrease the granularity of the image of the pixel array 28 is to truncate each row by saving only the first two pixels and discarding the second two. In each row, each remaining pixel is doubled to produce the 4×4 image of the blaze 28b.

Figure 8:
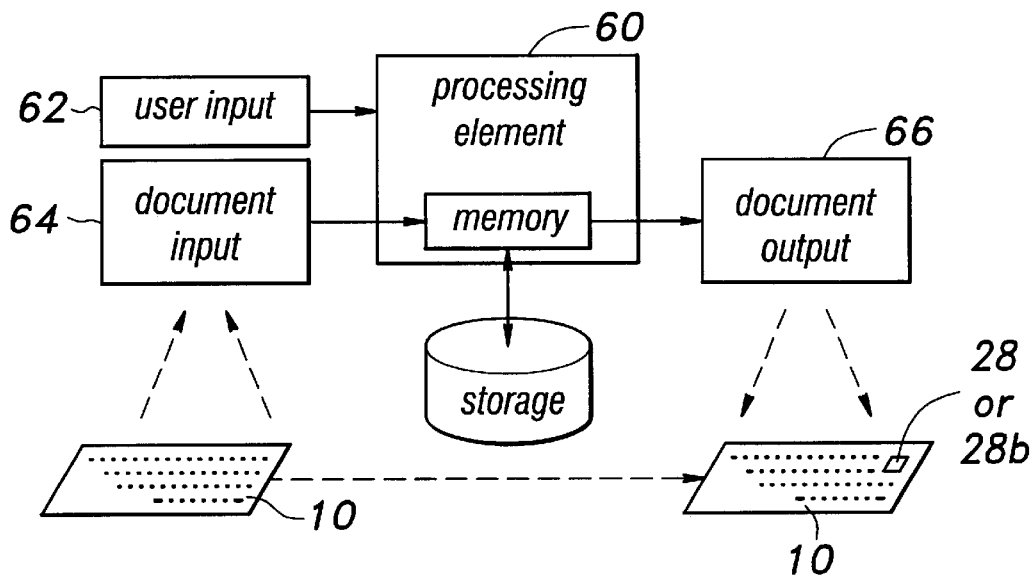
FIG. 8 illustrates a representative industrial application of this invention.

FIG. 8 illustrates an industrial application of my invention embodied in a computer system that includes a processing element 60, a user input element 62, a document input element 64, and a document output element 66. The processing element 60 may be embodied, for example, as a process, a processor, an application specific integrated circuit (ASIC) or a programmed computer. The user input element 62 may include a mouse, a keyboard, or even a scanner. The user input element 62 is the means by which private information may be received by the processing element 60 from a user. The document input element 64 is the means by which a digitized image of the document 10 may be received by the processing element 60. For example, the element 64 may be a scanner, or a camera. The processing element 60 operates according to the explanation given in respect of FIG. 1 to produce a digital output that, when provided to the document output element 66, results in provision of the document 10 with either the mark 28 or the blaze 28b placed therein or thereon. In this case assume that the element 66 is a printer. The document 10 may be the original of the document 10 with the printer printing the mark 28 or blaze 28b on the document itself, or the printer may reproduce the document 10 with the mark 28 or the blaze 28b. It should be realized that the complement of elements shown in FIG. 8 may be varied as appropriate for the medium and content of the document 10. Thus, for example, if the document 10 is a video, a VCR may be substituted for the scanner and for the printer.

Figure 9:
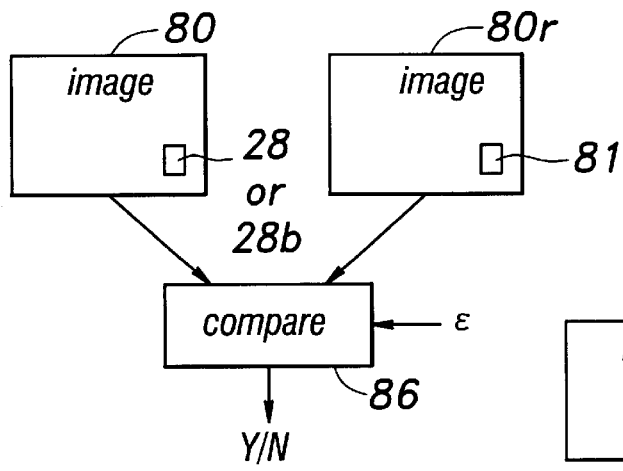
FIG. 9 illustrates how a blaze generated according to the invention is used to identify, authenticate, or otherwise validate an image.
Figure 10:
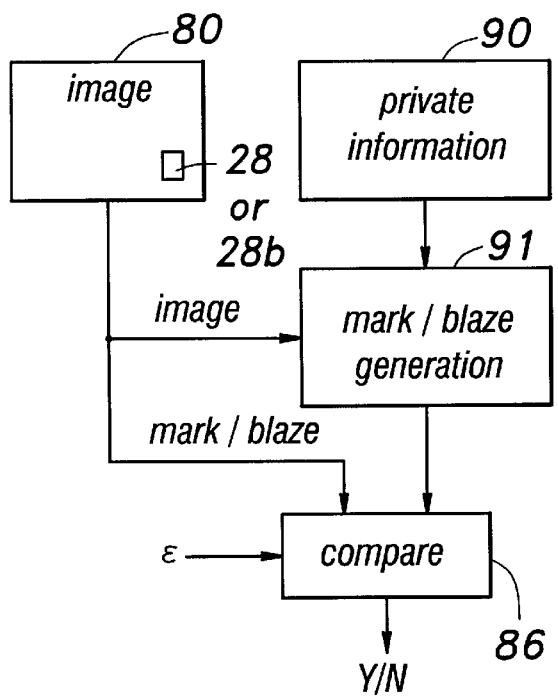
FIG. 10 illustrates upon image with a blaze generated according to the invention is validated in response to input private information.

Use of a mark or blaze according to the invention may be understood with reference to FIGS. 9 and 10. In FIG. 9, assume that an image 80 with a mark 28 or blaze 28b on it is in hand and assume further that the provenance of the image 80 is known and traces to an original author of the image 80 whose private information resulted in creation of the mark 28 or the blaze 28b. Assume that an image 80r is received that is represented as an authorized copy of the image 80. Assume further that the image 80r contains a mark 81 that is purported to be derived from the private information of the original author of the image 80. The image 80r can be identified, authenticated, or otherwise validated as a copy of the image 80 by comparison of the images 80 and 80r, including their respective marks or blazes. Comparison is done by an element 86 that employs a conventional image processing method to correlate the images and the marks or blazes. If the image 80r is a copy of the image 80, it is assumed that the images themselves will correlate within an error threshold ($\epsilon$) input to the comparison process 86. Manifestly, the comparison will include correlation of the mark 28 or blaze 28b with the mark 81.

Another way in which to identify, authenticate, or otherwise verify the provenance of the document 80 is to use the private information from which the mark 28 or blaze 28b was derived. Using the private information 90 and the content of the document 80, exclusive of the mark or blaze 28 or 28b, a digital array representing a mark or a blaze is generated at 91. The compare element 86 uses the mark or blaze array generated at 91, digitizes the mark or blaze 28 or 28b in the document 80 and compares the two representations. If the element 86 can correlate the mark or blaze representation generated by 91 with the mark or blaze representation generated from 28 or 28b within the error threshold ($\epsilon$), positive correlation (Y) will be indicated. Otherwise negative correlation (N) will be indicated.

Figure 11:
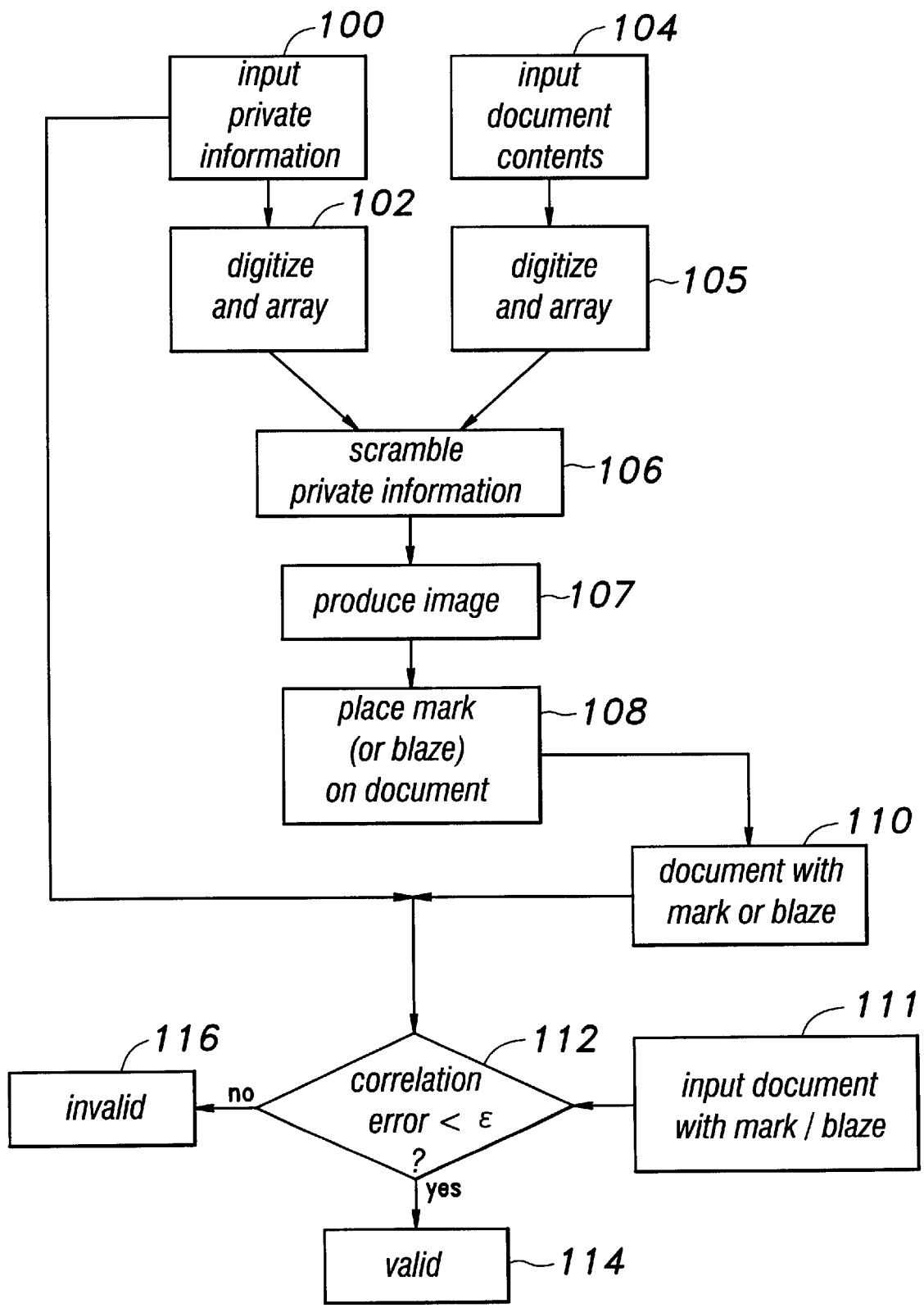
FIG. 11 is a flow diagram illustrating a computer-executed method according to the invention.

FIG. 11 illustrates flow diagram that embodies steps of a computer-executed method embodying the invention. The method has two phases: generation, and validation. The generation phase includes steps 100, 102, 104, 105, 106, 107 and 108. The validation phase includes steps 110, 111, 112, 114, and 116. The generation phase generates a mark or blaze in a manner corresponding with the illustrative description given earlier. Specifically, private information is received at step 100 and is processed at step 102 to create a digital representation of the private information. If desired, step 102 may include encryption. Alternatively, it should be realized that step 102 creates a number in digital form that represents the private information input at 100. In step 104, the contents of a document are received; in step 105 the document contents are processed to generate a digital array representing a feature of the document contents. For example, assuming that the document contents are an image, the array created in step 105 would represent the spectral content of the image input at 104. Alternatively, it should be realized that step 105 processes the document information to obtain a set, sequence, or array of digital numbers that represent the information in the document input at step 104. In step 106, the digital or numeric representation obtained in step 102 is scrambled in response to the digital or numeric representation of the document contents obtained in steps 105. In step 107, an image of the scrambled private information of step 106 is produced. The image may be the image of a mark. Alternatively, the mark image may be smeared to produce the image of a blaze. In step 108 the image of the mark or blaze produced in step 107 is placed on the document.

The inputs to the correlation phase may include the document imprinted in step 108. This document is input in step 110. Alternatively, the input to the correlation phase may be the private information originally input into the generation phase at step 100. In addition, a document with a mark or a blaze is input in step 111. The document input in step 111 is to be identified, authenticated, or otherwise verified by either the private information or the document input at step 110. In step 112, it is assumed that all of the inputs are rendered into a digital or numeric form so that they may be correlated in a straightforward manner using known methods. Correlation is performed and tested against the error threshold $\epsilon$. If less than the error threshold, the correlation validates the document input at step 111, taking the positive exit from step 112 to the validation indication at step 114. Otherwise, the correlation phase takes the negative exit from step 112, producing an invalid indication at step 116.

It should be manifest that the two phases of the method illustrated in FIG. 11 can be implemented in the same or separate processing machines. For example, it is contemplated that a machine that produces document copies by a photostatic process could incorporate the generation phase for generating of a mark or a blaze and marking documents. The same machine may also have the correlation phase incorporated into it in order to test the validity of documents. In fact, it is contemplated that either or both of the marking and correlation functions may be incorporated into copy machines, digital cameras, processing machines or systems that incorporate or connect to printers, scanners, facsimile machines, and the Internet, CD manufacturing and playing machines, tape machines, VCRs, and so forth. Also, either or both of generation and correlation phases could be incorporated into many systems that archive, index, or otherwise process documents such as electronic libraries/museum systems, electronic verification systems, driver's license verification systems, passport verification systems, ID card/credit card verification systems, and so forth.

Further, the method of FIG. 11 in either or both of its phases could be implemented as a software program or routine stored in a memory or storage device or present in a network node for programming a programmable device such as a processor or computer, or could be embodied in the electronic architecture of an electronic circuit or system composed of discrete parts or incorporated into one or more integrated circuits.

Clearly, the other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

I claim:

1. A computer-executed method of processing information of a document to create an identification mark, comprising:
    receiving private information;
    processing the private information to obtain a digital representation of the private information;
    processing the document information to obtain a digital representation of the document information;
    seeding a randomizer with the digital representation of the private information;
    causing the randomizer to scramble the digital representation of the private information in response to the digital representation of the document information; and
    producing an image of the scrambled private information.

2. The method of claim 1, wherein processing the private information includes encrypting the private information.

3. The method of claim 1, further including placing the image of the scrambled private information on the document.

4. The method of claim 1, wherein the image of the scrambled information has a granularity, the method further including producing a blaze by reducing the granularity of the image of the scrambled private information.

5. The method of claim 4, further including placing the blaze on the document.

6. The method of claim 5, wherein the blaze is placed substantially apart from the information of the document.

7. The method of claim 1, wherein the scrambler includes a linear feedback shift register (LFSR).

8. The method of claim 7, wherein causing the randomizer to scramble includes clocking the LFSR in response to the digital representation of the document information.

9. The method of claim 8, wherein processing the private information includes encrypting the private information.

10. The method of claim 8, wherein the image of the scrambled information has a granularity, the method further including producing a blaze by reducing the granularity of the image of the scrambled private information.

11. The method of claim 10, further including placing the blaze on the document.

12. A computer-executed method of processing information of a document to create an identification mark, comprising:

receiving private information;

processing the private information to obtain a numeric representation of the private information;

processing the document information to obtain a numeric representation of the document information;

seeding a randomizer with the numeric representation of the private information;

causing the randomizer to scramble the numeric representation of the private information in response to the numeric representation of the document information; and producing an image of the scrambled private information.

13. The method of claim 12, wherein processing the private information includes encrypting the private information.

14. The method of claim 12, further including placing the image of the scrambled private information on the document.

15. The method of claim 12, wherein the image of the scrambled information has a granularity, the method further including producing a blaze by reducing the granularity of the image of the scrambled private information.

16. The method of claim 15, further including placing the blaze on the document.

17. The method of claim 16, wherein the blaze is placed substantially apart from the information of the document.

18. The method of claim 12, wherein the scrambler includes a linear feedback shift register (LFSR).

19. The method of claim 18, wherein causing the randomizer to scramble includes clocking the LFSR in response to the numeric representation of the document information.

20. The method of claim 19, wherein processing the private information includes encrypting the private information.

21. The method of claim 19, wherein the image of the scrambled information has a granularity, the method further including producing a blaze by reducing the granularity of the image of the scrambled private information.

22. The method of claim 21, further including placing the blaze on the document.

23. A program product including a storage medium and executable instructions stored in the medium for processing information of a document to create an identification mark by:

receiving private information;

processing the private information to obtain a digital representation of the private information;

processing the document information to obtain a digital representation of the document information;

seeding a randomizer with the digital representation of the private information;

causing the randomizer to scramble the digital representation of the private information in response to the digital representation of the document information; and producing an image of the scrambled private information.

24. The product of claim 23, wherein processing the private information includes encrypting the private information.

25. The product of claim 23, further including placing the image of the scrambled private information on the document.

26. The product of claim 23, wherein the image of the scrambled information has a granularity, the method further including producing a blaze by reducing the granularity of the image of the scrambled private information.

27. The product of claim 26, further including placing the blaze on the document.

28. The product of claim 27, wherein the blaze is placed substantially apart from the information of the document.

29. The product of claim 23, wherein the scrambler includes a linear feedback shift register (LFSR).

30. The product of claim 29, wherein causing the randomizer to scramble includes clocking the LFSR in response to the digital representation of the document information.

31. The product of claim 30, wherein processing the private information includes encrypting the private information.

32. The product of claim 30, wherein the image of the scrambled information has a granularity, the method further including producing a blaze by reducing the granularity of the image of the scrambled private information.

33. The product of claim 32, further including placing the blaze on the document.

34. A program product including a storage medium and executable instructions stored on the medium for processing information of a document to create an identification mark, comprising:

receiving private information;

processing the private information to obtain a numeric representation of the private information;

processing the document information to obtain a numeric representation of the document information;

seeding a randomizer with the numeric representation of the private information;

causing the randomizer to scramble the numeric representation of the private information in response to the numeric representation of the document information; and producing an image of the scrambled private information.

35. The product of claim 34, wherein the step of processing the private information includes encrypting the private information.

36. The product of claim 34, further including placing the image of the scrambled private information on the document.

37. The product of claim 34, wherein the image of the scrambled information has a granularity, the method further including producing a blaze by reducing the granularity of the image of the scrambled private information.

38. The product of claim 37, further including placing the blaze on the document.

39. The product of claim 38, wherein the blaze is placed substantially apart from the information of the document.

40. The product of claim 34, wherein the scrambler includes a linear feedback shift register (LFSR).

41. The product of claim 40, wherein causing the randomizer to scramble includes clocking the LFSR in response to the numeric representation of the document information.

42. The product of claim 41, wherein processing the private information includes encrypting the private information.

43. The product of claim 41, wherein the image of the scrambled information has a granularity, the method further including producing a blaze by reducing the granularity of the image of the scrambled private information.

44. The product of claim 43, further including placing the blaze on the document.

45. A device for processing information of a document to produce an identification mark in response to private information, comprising:
   first means for providing a first digital representation of the private information;
   second means for providing a second digital representation of the document information;
   a randomizer for scrambling the first digital representation in response to the second representation to produce a third digital representation of scrambled private information; and
   third means for providing an image of the third digital representation.

46. The device of claim 45, further including means for encrypting the private information, the first means for scrambling encrypted private information.

47. The device of claim 45, further including fourth means for changing the granularity of the image of the third digital representation.

48. The device of claim 45, wherein the randomizer is a linear feedback shift register.

49. A device for processing information of a document to create an identification mark, comprising;
   first means for providing a first numeric representation of the private information;
   second means for providing a second numeric representation of the document information;
   a randomizer for scrambling the first numeric representation in response to the second numeric representation to produce a third numeric representation of scrambled, private information; and
   third means for providing an image of the third numeric representation.

50. The device of claim 49, further including means for encrypting the private information, the first means for scrambling encrypted private information.

51. The device of claim 49, further including fourth means for changing the granularity of the image of the third digital representation.

52. The device of claim 49, wherein the randomizer is a linear feedback shift register.

* * * * *